(12) United States Patent
Ye et al.

(10) Patent No.: US 10,393,121 B2
(45) Date of Patent: Aug. 27, 2019

(54) ELECTRICALLY DRIVEN PUMP AND METHOD FOR MANUFACTURING THE SAME

(71) Applicant: ZHEJIANG SANHUA AUTOMOTIVE COMPONENTS CO., LTD., Hangzhou, Zhejiang (CN)

(72) Inventors: Wei Ye, Zhejiang (CN); Junchao Zhang, Zhejiang (CN); Jun Zhang, Zhejiang (CN); Junfeng Bao, Zhejiang (CN)

(73) Assignee: HANGZHOU SANHUA RESEARCH INSTITUTE CO., LTD., Hangzhou, Zhejiang (CN)

( * ) Notice: Subject to any disclaimer, the term of this patent is extended or adjusted under 35 U.S.C. 154(b) by 352 days.

(21) Appl. No.: 15/198,432

(22) Filed: Jun. 30, 2016

(65) Prior Publication Data
US 2017/0009778 A1    Jan. 12, 2017

(30) Foreign Application Priority Data

Jul. 6, 2015   (CN) .......................... 2015 1 0400543

(51) Int. Cl.
*F04D 13/06*   (2006.01)
*F04D 29/043*   (2006.01)
(Continued)

(52) U.S. Cl.
CPC ......... *F04D 13/0606* (2013.01); *F04D 13/06* (2013.01); *F04D 25/06* (2013.01);
(Continued)

(58) Field of Classification Search
CPC .... F04D 13/0606; F04D 29/30; F04D 29/305; F04D 29/242; H02K 1/2706; H02K 5/128
See application file for complete search history.

(56) References Cited

U.S. PATENT DOCUMENTS 2,911,549 A * 11/1959 Culk ..................... F25B 49/022
310/86
2007/0251473 A1   11/2007 Schafer
(Continued)

FOREIGN PATENT DOCUMENTS

CN   104061169 A   9/2014
GB      2488219 A   8/2012
(Continued)

OTHER PUBLICATIONS

Favaloro, Michael, "Carbon fiber/PPS thermoplastic in aerospace applications," Dec. 16, 2009, https://www.compositesworld.com/news/carbon-fiberpps-thermoplastic-in-aerospace-applications, retrieved Feb. 5, 2019 (Year: 2009).*
(Continued)

*Primary Examiner* — Patrick Hamo
(74) *Attorney, Agent, or Firm* — Apex Attorneys at Law, LLP; Yue (Robert) Xu

(57) ABSTRACT

An electrically driven pump includes a rotor assembly, and the rotor assembly includes a first part and a second part. The first part is integrally formed by injection molding, and includes an upper plate and vanes of an impeller, the upper plate is integrally formed with the vanes by injection molding, and each of the vanes is formed with a first connecting portion. The second part is integrally formed by injection molding, the first part and the second part are fixed by welding the first connecting portion and a second connecting portion, and in this way, the manufacturing cost of the rotor assembly is reduced, also a shaft sleeve integrally formed has a simple forming process.

13 Claims, 9 Drawing Sheets

(51) Int. Cl.
    *F04D 25/06* (2006.01)
    *F04D 29/053* (2006.01)
    *F04D 29/24* (2006.01)
    *F04D 29/30* (2006.01)
    *H02K 5/18* (2006.01)
    *F04D 29/40* (2006.01)
    *F04D 29/42* (2006.01)
    *F04D 29/58* (2006.01)

(52) U.S. Cl.
    CPC ......... *F04D 29/043* (2013.01); *F04D 29/053* (2013.01); *F04D 29/24* (2013.01); *F04D 29/30* (2013.01); *F04D 29/406* (2013.01); *F04D 29/426* (2013.01); *F04D 29/5813* (2013.01); *H02K 5/18* (2013.01)

(56) References Cited

U.S. PATENT DOCUMENTS

| | | | |
|---|---|---|---|
| 2008/0264600 A1 | 10/2008 | Bielesch | |
| 2009/0079293 A1* | 3/2009 | Hashimoto | H02K 1/145 |
| | | | 310/257 |
| 2010/0158714 A1 | 6/2010 | Werson | |
| 2011/0116952 A1 | 5/2011 | Yi et al. | |
| 2013/0039784 A1* | 2/2013 | Teubel | F04D 29/026 |
| | | | 417/355 |
| 2013/0189134 A1 | 7/2013 | Irie | |
| 2014/0232230 A1* | 8/2014 | Yabe | H02K 1/276 |
| | | | 310/156.11 |
| 2014/0239748 A1 | 8/2014 | Herz et al. | |
| 2014/0354104 A1* | 12/2014 | Bouarroudj | H02K 1/2773 |
| | | | 310/156.43 |
| 2015/0300356 A1* | 10/2015 | Malvasi | F04D 13/06 |
| | | | 417/423.7 |
| 2015/0369257 A1 | 12/2015 | Fujii et al. | |
| 2017/0055669 A1* | 3/2017 | Li | H02K 29/03 |

FOREIGN PATENT DOCUMENTS

| | | |
|---|---|---|
| JP | 2004225588 A | 8/2004 |
| JP | 2005019434 A | 1/2005 |
| JP | 2010007642 A | 1/2010 |
| KR | 20110055281 A | 5/2011 |
| WO | 2014147678 A1 | 9/2014 |
| WO | 2015027965 A1 | 3/2015 |

OTHER PUBLICATIONS

"Glass-reinforced PPS," Jul. 23, 2010 (STAFF post), https://www.compositesworld.com/products/glass-reinforced-pps, retrieved Feb. 5, 2019 (Year: 2010).*

The First Office Action for KR 10-2016-0080012, dated May 18, 2017.

European Search Report for application No. 16176860.1-1607, dated Dec. 5, 2016.

European Search Report for application No. 18181222.3, dated Oct. 29, 2018.

* cited by examiner

ELECTRICALLY DRIVEN PUMP AND METHOD FOR MANUFACTURING THE SAME

CROSS REFERENCE TO RELATED APPLICATION

The present application claims the benefit of priority to Chinese patent application No. 201510400543.7 titled "METHOD FOR MANUFACTURING ELECTRICALLY DRIVEN PUMP" and filed with the Chinese State Intellectual Property Office on Jul. 6, 2015, the entire disclosure of which is incorporated herein by reference.

FIELD

This application relates to a vehicle heat management system, and particularly relates to a pump of the vehicle heat management system and a method for manufacturing the pump.

BACKGROUND

In recent decades, electrically driven pumps have gradually replaced conventional mechanical pumps, and have been widely used in heat circulating systems. The electrically driven pumps have various advantages, such as no electromagnetic interference, high efficiency, environmental protection, and stepless speed regulation, and can meet the requirements of the market well.

The electrically driven pump includes a rotor assembly and a stator assembly which are completely isolated by a partition, thereby avoiding an issue of liquid leakage in a conventional motor-type brushless direct-current water pump. Currently, the rotor assembly includes an impeller and a rotor, and the rotor assembly is generally formed integrally by injection molding, that is, the impeller and the rotor are made of the same material, the rotor is magnetized, and the impeller is not magnetized, which wastes the magnetic material, and the manufacturing cost is high. Furthermore, the magnetic material is brittle, which results in that the impeller has a low toughness and is apt to be damaged, and the manufacturing process is complicated.

Therefore, it is necessary to improve the conventional technology, to address the above technical issues.

SUMMARY

An object of the present application is to provide an electrically driven pump, which facilitates reducing the manufacturing cost and simplifying the manufacturing process.

To achieve the above objects, the following technical solutions are adopted in the present application. An electrically driven pump includes a shaft, a rotor assembly, and a stator assembly. The rotor assembly is closer to the shaft with respect to the stator assembly, the shaft is fixedly arranged, and the rotor assembly is rotatable about the shaft. The rotor assembly includes a first part and a second part, and the first part and the second part are separately formed. The first part of the rotor assembly includes an upper plate and vanes, the upper plate is integrally formed with the vanes by injection molding, each of the vanes includes a fixed portion and a free portion, the fixed portion is fixed to the upper plate, and the free portion is formed with a first connecting portion. The second part of the rotor assembly includes a lower plate, a permanent magnet and a shaft sleeve, the second part of the rotor assembly includes an injection molded body including the lower plate and the shaft sleeve and formed by taking the rotor permanent magnet as an insert, the lower plate is formed with a second connecting portion, and the first connecting portion and the second connecting portion are fixed by welding.

A method for manufacturing an electrically driven pump is further provided according to the present application, the electrically driven pump includes a rotor assembly, the rotor assembly includes a first part and a second part, the first part includes an upper plate and vanes, the second part includes a lower plate, a permanent magnet and a shaft sleeve, and the formation of the rotor assembly includes:

step 1, manufacturing parts, including: forming the permanent magnet by injection molding or sintering, wherein the permanent magnet is formed by injection molding or sintering with a material containing magnetic substances, the permanent magnet is anisotropic, and the magnetic substances are configured to form a primary magnetic field in a mould for forming the permanent magnet;

step 2, forming the first part and the second part, including: forming the first part including the upper plate and the vanes by injection molding with a mixed material containing polyphenylene sulfide plastic and glass fibers, and forming the second part including the shaft sleeve and the lower plate by injection molding with a mixed material containing the polyphenylene sulfide plastic and carbon fibers and with the permanent magnet as an injection molding insert;

step 3, assembling a rotor assembly, including: assembling the manufactured first part and second part by cooperating vanes with the lower plate, and fixing the assembled first part and second part into one piece by ultrasonic welding; and step 4, magnetizing, including fully magnetizing the rotor assembly.

The electrically driven pump according to the present application includes the rotor assembly, the rotor assembly includes the first part and the second part, the upper plate and the vanes of the first part are integrally formed by injection molding, and the lower plate of the second part is formed by injection molding with the permanent magnet as an injection molding insert. The first part and the second part are fixed by welding. In this way, the material of the first part may be different from the material of the second part, and the cost may be reduced. Furthermore, the shaft sleeve is integrally formed, without requiring other injection molding inserts, thus the manufacturing process may be simplified. Further, the shaft sleeve is integrally formed with the second part, thus the manufacturing process may be simplified.

DETAILED DESCRIPTION

The present application is further described in conjunction with drawings and embodiments.

Figure 1:
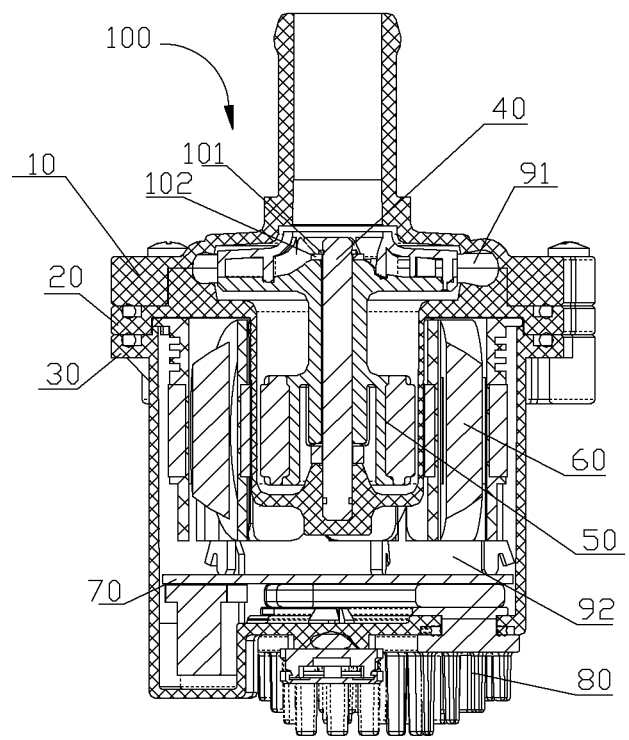
FIG. 1 is a schematic sectional view showing the structure of an electrically driven pump according to an embodiment of the present application.

Reference is made to FIG. 1, which is a schematic view showing the structure of an electrically driven pump 100. The electrically driven pump 100 includes a first housing 10, a partition 20, a second housing 30, a shaft 40, a rotor assembly 50, a stator assembly 60, a circuit board 70 and a heat dissipating assembly 80. The electrically driven pump 100 includes an inner chamber including a space enclosed by the first housing 10 and the second housing 30, and the partition 20 divides the inner chamber into a first chamber 91 and a second chamber 92. The first chamber 91 allows a working medium to flow through, and the rotor assembly 50 is arranged in the first chamber 91. No working medium flows through the second chamber 92, and the stator assembly 60 and the circuit board 70 are arranged in the second chamber 92. The shaft 40 is fixed to the partition 20 by injection molding. The rotor assembly 50 is rotatable about the shaft 40. The rotor assembly 50 is isolated from the stator assembly 60 by the partition 20. The stator assembly 60 is electrically connected to the circuit board 70. The circuit board 70 is connected to an external circuit by a plug connector. The heat dissipating assembly 80 is configured to transfer heat generated by the circuit board 70 and dissipate the heat, and the heat dissipating assembly 80 is fixedly installed onto the second housing 30. In this embodiment, the electrically driven pump 100 is an inner rotor type electrically driven pump, and the inner rotor type electrically driven pump refers to a pump in which the rotor assembly 50 is arranged to be closer to the shaft 16 than the stator assembly 60 by taking the shaft 40 as a central axis. In this embodiment, the shaft 40 is fixed with respect to the partition 20, and the rotor assembly 50 is rotatable with respect to the shaft 40.

Figure 2:
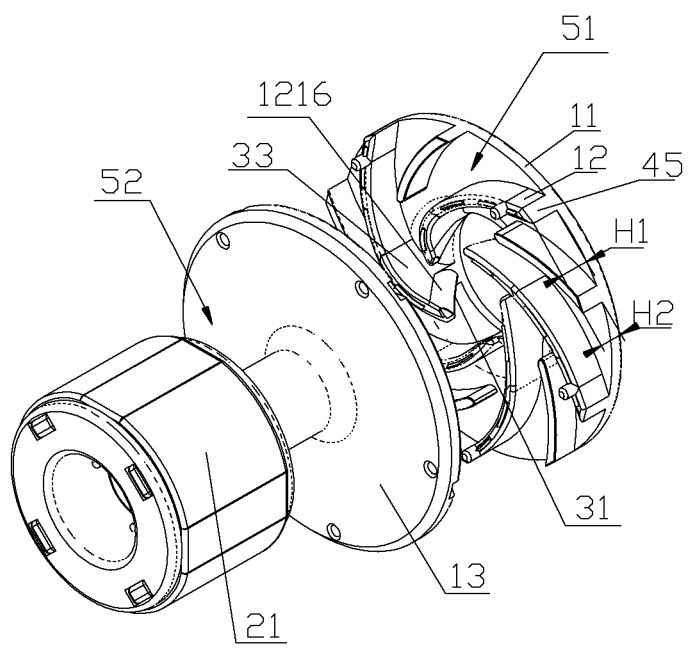
FIG. 2 is a schematic exploded view showing the structure of a rotor assembly in FIG. 1.
Figure 3:
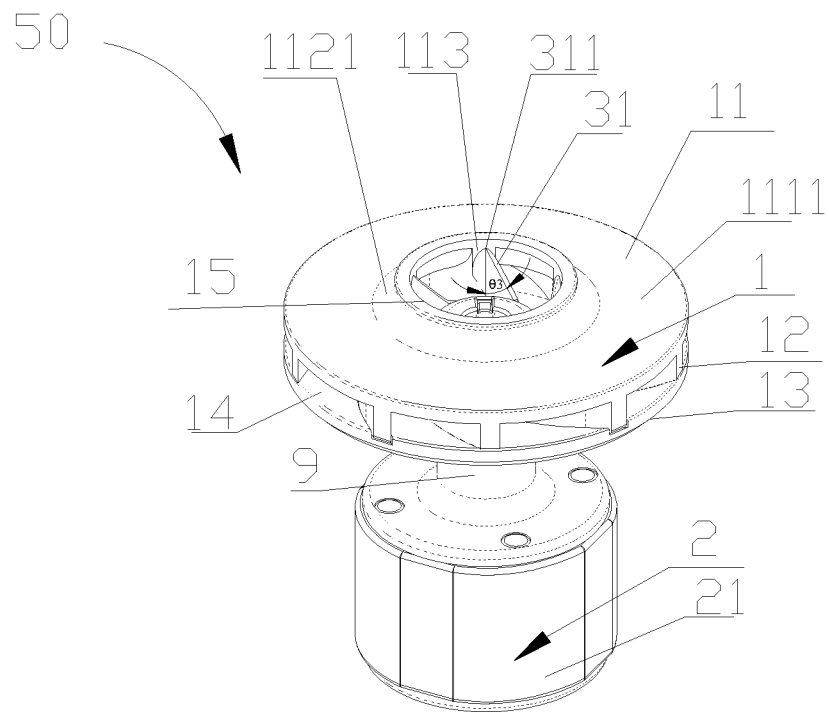
FIG. 3 is a schematic perspective view showing the structure of the rotor assembly in FIG. 1.
Figure 4:
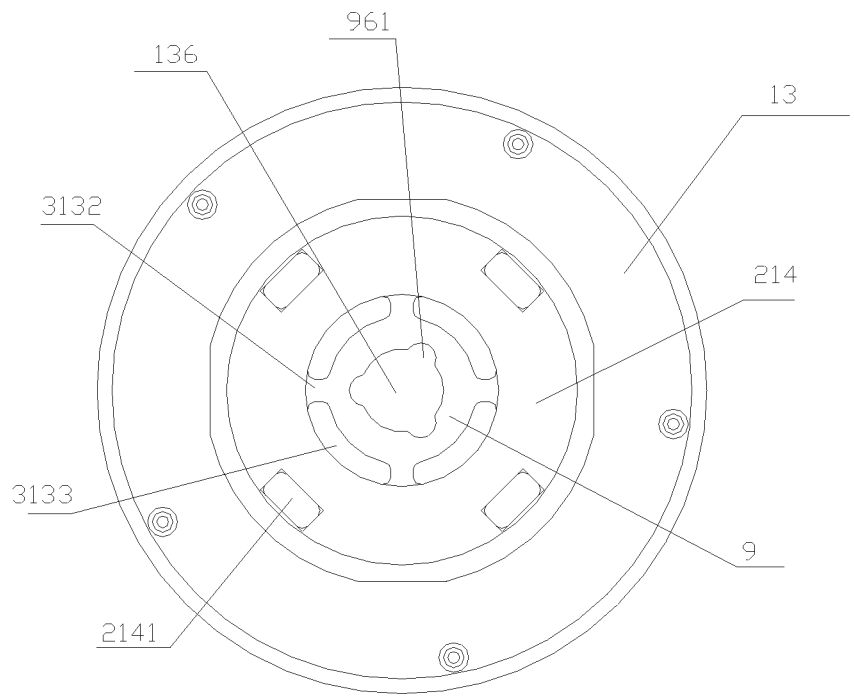
FIG. 4 is a schematic front view showing the structure of a bottom of the rotor assembly in FIG. 2.

FIGS. 2 to 9 are schematic views showing the structure of the rotor assembly 50. Referring to FIG. 2, the rotor assembly 50 includes injection molded members of two parts, including a first part 51 and a second part 52 which are fixed to each other by welding. The first part 51 includes an upper plate 11 and vanes 12, and the first part 51 is integrally formed by injection molding. In an embodiment, the material for injection molding is a mixture of polyphenylene sulfide plastic (abbreviated as PPS plastic) and glass fibers. The second part 52 includes a permanent magnet 21, a lower plate 13 and a shaft sleeve 9. The second part 52 is formed by injecting molding using a mixed material containing the PPS plastic and carbon fibers with the permanent magnet 21 as an injection molding insert. In addition, the injection molding material may also employ other thermoplastic materials having a good mechanical performance. Referring to FIG. 3, the rotor assembly 50 includes an impeller 1 and a rotor 2 according to the function. The impeller 1 includes the upper plate 11, the vanes 12 and the lower plate 13. The rotor 2 includes the permanent magnet 21. In this embodiment, the permanent magnet 21 is of a substantially annular structure, and the permanent magnet 21 is formed by injection molding, of course, the rotor 2 may also be embodied as other structure. In this embodiment, the permanent magnet 21 and portions of the impeller 1 except for the upper plate 11 and the vanes 12 are integrally formed by injection molding, and then are used in the electrically driven pump.

Referring to FIG. 3, the impeller 1 includes an impeller inlet 15, the upper plate 11, the vanes 12, the lower plate 13, and an impeller outlet 14. The vanes 12 are arranged between the upper plate 11 and the lower plate 13. The impeller inlet 15 is formed in the upper plate 11. Multiple impeller outlets 14 are formed at an outer periphery of the upper plate 11 between adjacent vanes 12 and between the upper plate 11 and the lower plate 13. Multiple impeller passages are formed between adjacent vanes 12, and each of the impeller passages is in communication with the impeller inlet 15 and one of the impeller outlets 14. An upper side and a lower side of each of the impeller passages are closed by the upper plate 11, the lower plate 13 and side walls of the vanes at two lateral sides of the impeller passage.

Figure 5:
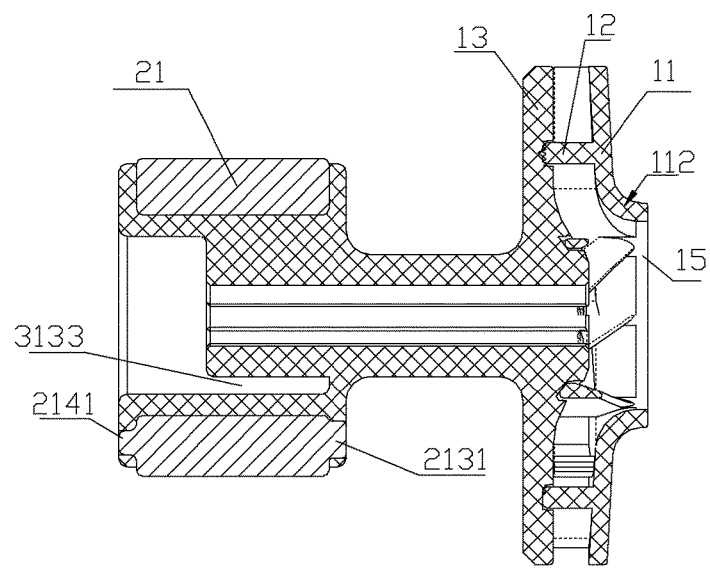
FIG. 5 is a schematic sectional view showing the structure of the rotor assembly in FIG. 2.
Figure 6:
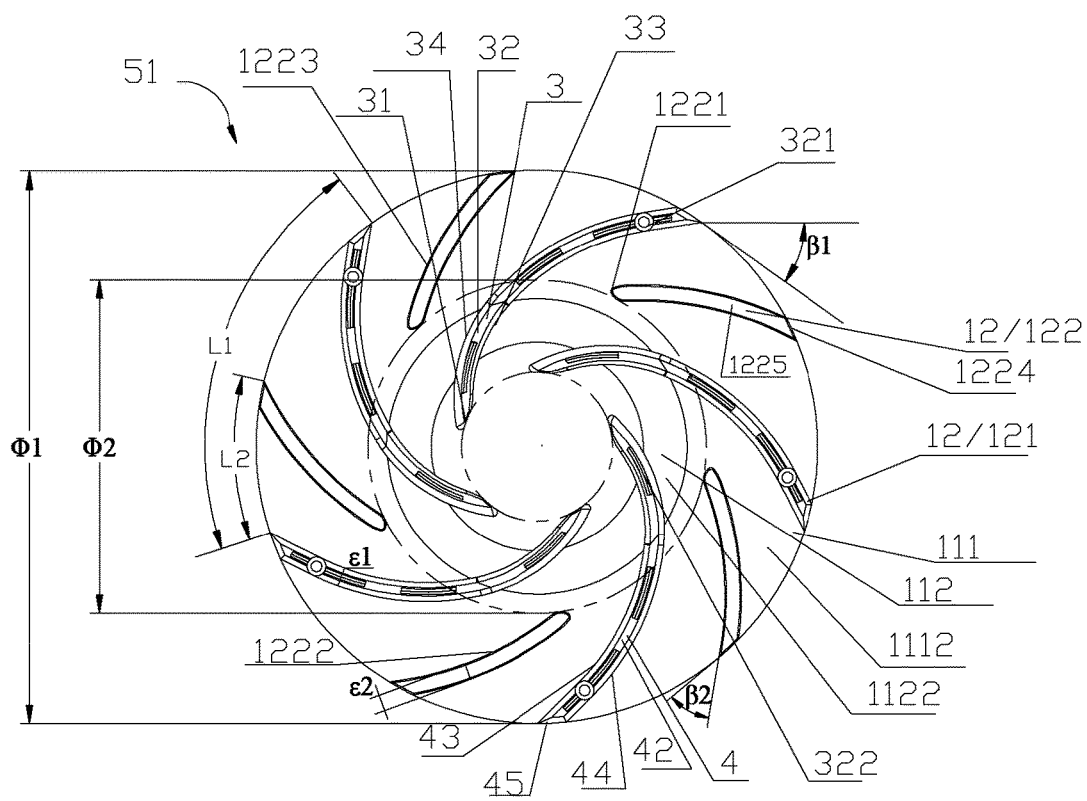
FIG. 6 is a schematic front view showing the structure of a first part of the rotor assembly in FIG. 2.

Referring to FIGS. 3, 5, and 6, the upper plate 11 has a substantially annular shape. The upper plate 11 includes a planar portion 111 and a cambered portion 112. The planar portion 111 includes an upper plane 1111 and a lower plane 1112. The cambered portion 112 includes a first cambered portion 1121 and a second cambered portion 1122. The first cambered portion 1121 is smoothly connected to the upper plane 1111, the second cambered portion 1122 is smoothly connected to the lower plane 1112, and the impeller inlet 15 is surrounded by the cambered portion 112. The vanes 12 are integrally formed with the lower plane 1112 of the upper plate 11 by injection molding, or are integrally formed with the lower plane 1112 and the second cambered portion 1122 by injection molding. Referring to FIG. 3, at a side wall of the impeller inlet 15, the impeller 1 includes a vertical portion 113 tangential to the side wall of the impeller inlet 15, and actually, the vertical portion 113 is a connecting portion where the upper plate 11 is connected to a part of the vane 12, which facilitates the demolding of the first part 51 of the impeller 1. In this embodiment, the planar portion 111 is arranged at a certain angle with respect to a horizontal plane, and the vanes 12 are arranged to be approximately perpendicular to the horizontal plane. An outer edge of the upper plate 111 defines substantially a first circumference with a diameter of Φ1, and the diameter of the impeller is equal to the diameter of the first circumference, and is also equivalent to an outer diameter of a defining circle defined by tails of outer edges of the vanes 12.

Referring to FIGS. 2 and 6, the vanes 12 include first vanes 121 and second vanes 122. The first vanes 121 and the second vanes 122 are each in a circular-arc shape. The length of each of the first vanes 121 is greater than the length of each of the second vanes 122. The first vanes 121 are distributed at equal intervals along a circumference of the impeller 1, and the second vanes 122 are distributed at equal intervals along the circumference of the impeller 1. The number of the first vanes 121 is the same as the number of the second vanes 122. The first vanes 121 and the second vanes 122 are distributed alternately along the circumference of the impeller 2, that is, each of the second vanes 122 is arranged between two adjacent first vanes 121. The first vanes 121 and the second vanes 122 may each be embodied as one cambered surface, or a combination of more than two cambered surfaces, or a combination of a cambered surface and a plane.

Referring to FIG. 6, the first vanes 121, and the lower plane 1112 and the second cambered portion 1122 of the upper plate 11 are an integral structure formed by injection molding. Each of the first vanes 121 includes a first segment 3 integrally formed with the second cambered portion 1122 by injection molding, and a second segment 4 integrally formed with the lower plane 1112 by injection molding. The first segment 3 includes a first end 31, a first bottom 32, a first concave side 33, and a first convex side 34. The second segment 4 includes a second bottom 42, a second concave side 43, a second convex side 44, and a second end 45. The first end 31 protrudes into the impeller inlet 15. The first end 31 is a beginning of the first vane 121, and the second end 45 is a terminal end of the first vane 121. The length of an arc between the first end 31 and the second end 45 is the length of the first vane 121. In this embodiment, the first concave side 33 and the second concave side 43 form a first side of the first vane 121, the first convex side 34 and the second convex side 44 form a second side of the first vane 121, the first end 31 is a beginning of the first vane 121, and the second end 45 is a first tail portion of the first vane 121. On the first circumference, a first circular arc with a length of L1 is defined between intersection points of the second concave sides 43 of two adjacent first vanes 121 with the first circumference. The length L1 of the first circular arc is equal to the length of each circular arc obtained by dividing the first circumference into equal parts according to the number of the first vanes 121. In this embodiment, the number of the first vanes 121 is five, and the length L1 of the first circular arc is equal to the length of each circular arc obtained by dividing the first circumference into five equal parts.

Referring to FIG. 2, the part where the first end 31 is located is a flow guiding part of the first vane 121. Working medium enters into the impeller through the impeller inlet 15 and is guided into a circulating passage between adjacent first vanes 121 via the first end 31, and the first end 31 is fixed to an inner side wall of the impeller inlet 15 by injection molding. The first segment 3 further includes a connecting side 1216 arranged between the first end 31 and the first concave side 33. A distance from the connecting side 1216 to the first convex side 34 is smaller than a distance from the first concave side 33 to the first convex side 34. In this way, the connecting side 1216 allows this section of the first vane 121 has a reduced thickness, thus, the gap between the first vanes 121 at the part from the first end 31 to a terminal position of the connecting side 1216 may be increased, which may reduce the flowing resistance to the working medium, and allows the working medium to flow more smoothly.

Referring to FIGS. 2 and 3, the first end 31 protrudes into the impeller inlet 15. A straight line is defined by passing through a fixing point 311 at which the first vane 121 is fixed to the side wall of the impeller inlet 15 and being in parallel with a center line of the side wall of the impeller inlet 15, and an included angle between the first end 31 and the straight line is defined as a front inclination angle θ3. The front inclination angle θ3 ranges from 20 degrees to 50 degrees. A free portion of the first end 31 inclines towards the direction of a central axis of the impeller inlet 15 by 20 degrees to 50 degrees, and in this way, the part where the first end 31 is located can better restrict the flowing of the working medium.

The thickness of the first vane 121 is represented by ε1, and the thickness ε1 of the first vane 121 refers to a vertical distance between the first side and the second side of the first vane. In this embodiment, considering that the material for forming the vane by injection molding has a certain brittleness, the first vane 121 may be fractured, broken or damaged if it is too thin, therefore, the value of the thickness ε1 of the first vane 121 according to the present application is not too small. In this embodiment, the thickness ε1 of the first vane 121 generally ranges from 0.8 mm to 2 mm. In this embodiment, for facilitating demolding, the first side and the second side are both arranged to have a draft angle, however, since the draft angle are very small, the draft angles may be neglected when compared to the heights of the first vane 121.

Referring to FIG. 6, on the first circumference, at an intersection point where the second concave side 43 of the first vane 121 or an extending surface of the second concave side 43 intersects the first circumference, an included angle between a tangential line of the second concave side 43 and a tangential line of the first circumference at the intersection point is defined as a outlet angle β1 of the first vane 121. The outlet angle β1 of the first vane 121 ranges from 20 degrees to 60 degrees. In this embodiment, the impeller 1 of the electrically driven pump 100 is a low specific speed centrifugal impeller, and generally selects a large outlet angle to reduce the frictional loss between the upper plate and the lower plate as much as possible, thus ensuring the efficiency of the electrically driven pump. However, If the outlet angle β1 is too large that may adversely affect the stability of performance of the impeller 1, thus, for acquiring a stable performance curve and preventing overloading, in view of the structure of the impeller 1 according to this embodiment, the outlet angle β1 of the first vane 121 according to the present application ranges from 20 degrees to 60 degrees.

Referring to FIGS. 2 and 6, the first vane 121 includes a bottom, and the bottom includes the first bottom 32 and the second bottom 42. The distance from the second bottom 42 to the lower plane 1112 of the upper plate 11 gradually decreases in the direction from a central portion to an edge of the upper plate 11. The second end 45 is flush with the outer edge of the upper plate 11 of the impeller at the first circumference. The second end 45 is a small segment of cylindrical surface, in other words, the second end 45 is a portion of a defining cylindrical surface formed by extending the outer edge of the upper plate 11. The second end 45 connects the second concave side 43 and the second convex side 44 at a tail end of the first vane 121. The height of the second end 45 is the smallest height of the first vane 121, and the height of the first vane 121 at the second end 45 is defined as an outlet height H1 of the first vane 121. The bottom of the first vane 121, i.e., a free portion of the first vane, is provided with a first connecting portion. The first connecting portion includes a first position-limiting portion 321 and second position-limiting portions 322. The protruding height of each second position-limiting portion 322 is smaller than the height of the first position-limiting portion 321, and the second position-limiting portions 322 are spaced apart along the bottom. Each first vane 121 is provided with the first position-limiting portion 321 and multiple second position-limiting portions 322.

Referring to FIG. 6, the second vane 122 is integrally formed with the planar portion 111 of the upper plate 11 by injection molding. The second vane 122 starts from a defining second circumference with a diameter of Φ2, and terminates at the first circumference with the diameter of Φ1, and the diameter Φ2 of the second circumference ranges from 0.6 time to 0.75 time of the diameter Φ1 of the first circumference. The second vane 122 includes a front end 1221, a concave side 1222, a convex side 1223, a rear end 1224 and a bottom 1225. The front end 1221 is arranged on the second circumference with the diameter of Φ2, and the rear end 1224 is arranged on the first circumference with the diameter of Φ1. On the first circumference, at an intersection point where the concave side 1222 or an extending surface of the concave side 1222 intersects the first circumference, an included angle between a tangential line of the concave side 1222 and a tangential line of the first circumference is defined as an outlet angle β2 of the second vane 122. In this embodiment, the front end 1221 is a beginning of the second vane 122, the rear end 1224 is a terminal end of the second vane 122, the concave side 1222 is a third side of the second vane 122, and the convex side 1223 is a fourth side of the second vane 122. The outlet angle β2 of the second vane 122 is smaller than or equal to the outlet angle β1 of the first vane 121. In this embodiment, the outlet angle β2 of the second vane 122 is smaller than the outlet angle β1 of the first vane 121 by 3 degrees to 10 degrees. Except for the front end 1221 and the rear end 1224, a thickness ε2 of the second vane 122 ranges from 0.6 time to 1 time of the thickness ε1 of the first vane 121, and by taking the central axis of the impeller inlet 15 as a center of circle, a height of the second vane 122 is smaller than or equal to a height of the first vane 121 on the same defining circle.

Referring to FIGS. 2 and 6, a distance from the bottom 1225 of the second vane 122 to the lower surface of the upper plate 11 gradually decreases in a direction from the front end 1221 to the rear end 1224, and the distance has the smallest value at the first circumference. An outlet height H2 of the second vane 122 is the smallest distance from the bottom 1225 of the second vane 122 to the lower surface of the upper plate 11 at the first circumference. In this embodiment, the height of the second vane is smaller than the height of the first vane on the same defining circle, and the outlet height H2 of the second vane is smaller than the outlet height H1 of the first vane. Thus, after the impeller is assembled, a certain interval or a small gap is formed between the bottom 1225 of the second vane 122 and the lower plate 13. A circular arc between a tangential line of the concave side 1222 of the second vane 122 and a tangential line of the second concave side 43 of an adjacent first vane 121 at the first circumference is defined as a second circular arc with a length of L2, and the arc length L2 of the second circular arc ranges from 0.35 time to 0.5 time of the arc length L1 of the first circular arc.

Figure 7:
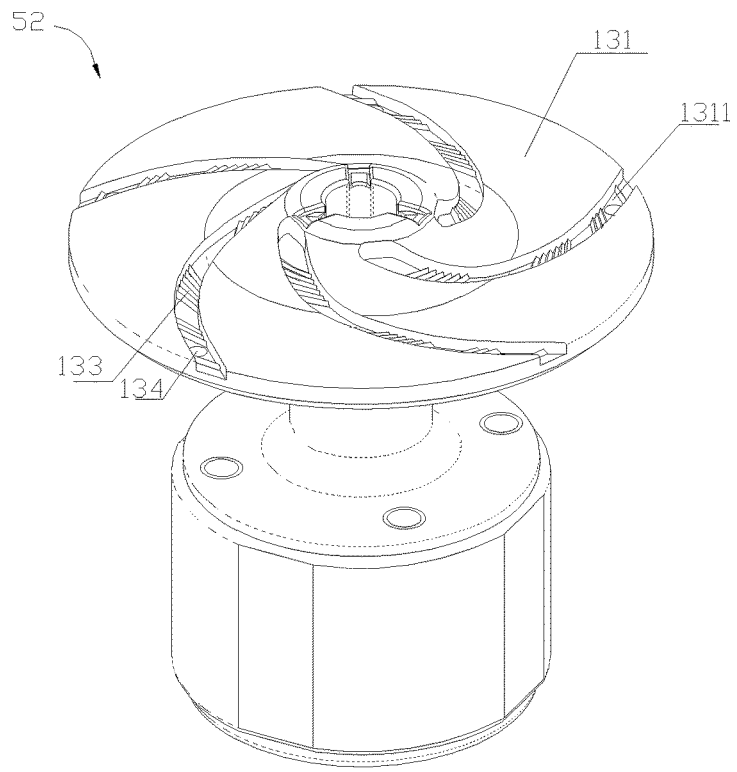
FIG. 7 is a schematic perspective view showing the structure of a second part of the rotor assembly in FIG. 2.
Figure 8:
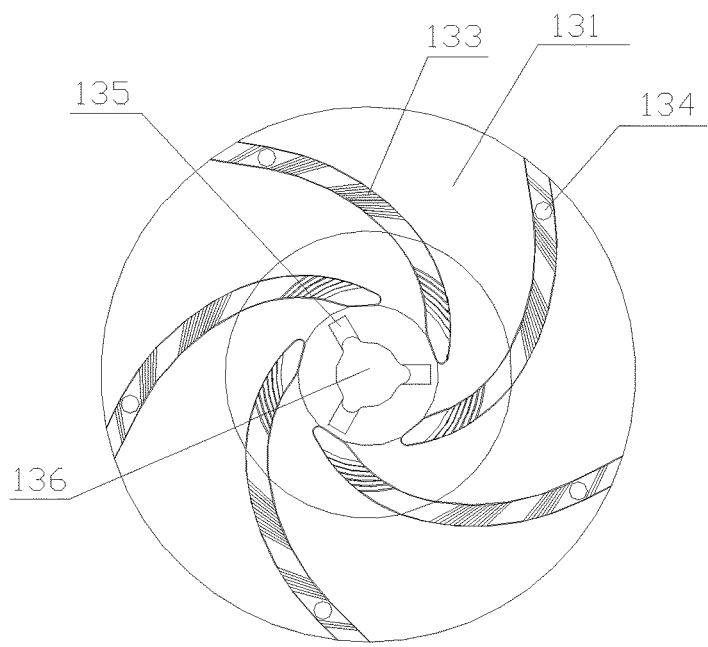
FIG. 8 is a schematic front view showing the structure of a top of the second part of the rotor assembly in FIG. 7.
Figure 9:
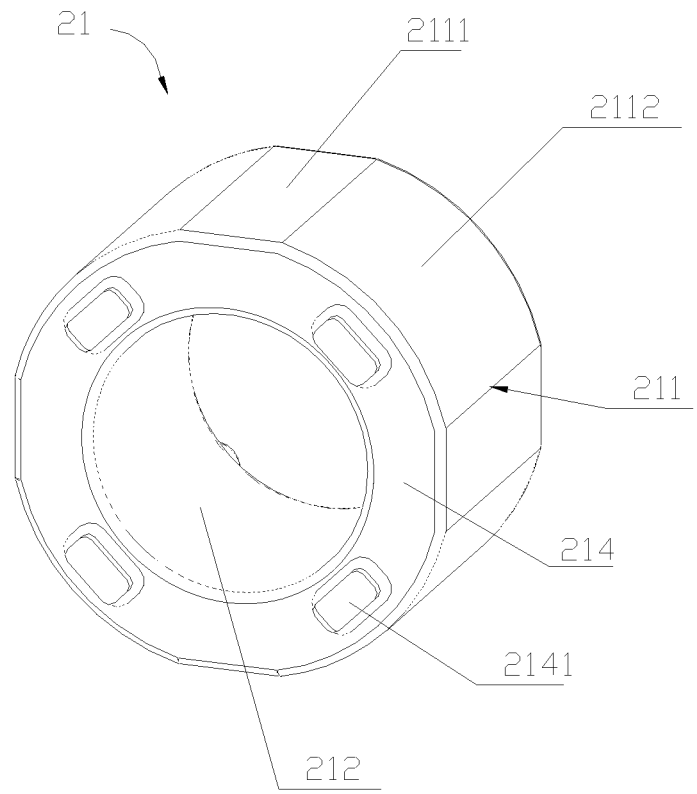
FIG. 9 is a schematic perspective view showing the structure of a permanent magnet in FIG. 2.
Figure 10:
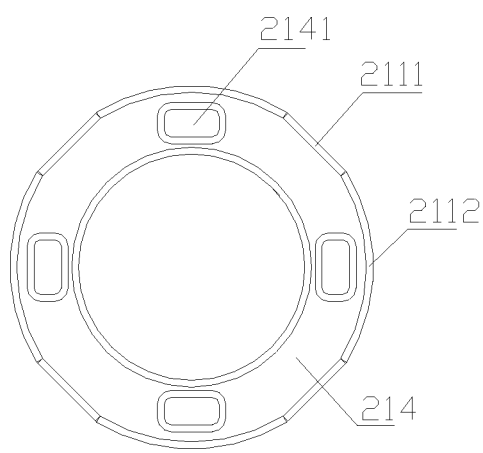
FIG. 10 is a schematic front view showing the structure of a second end surface of the permanent magnet in FIG. 9.
Figure 11:
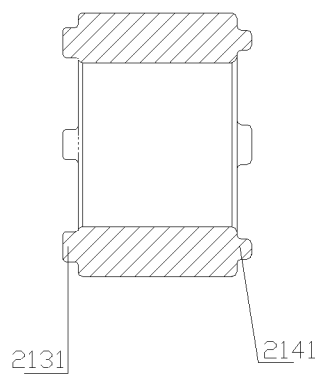
FIG. 11 is a schematic sectional view showing the structure of the permanent magnet in FIG. 9.

Referring to FIGS. 7 and 8, the lower plate 13 includes an upper side 131 and a lower side. The lower plate 13 is fixedly connected to the bottoms of the vane 12 via the upper side 131, the upper side 131 of the lower plate 13 is configured to have a shape matching with the shape of the bottoms of the vanes 12, and the lower side of the lower plate 13 is a substantially horizontal plane. The upper side 131 of the lower plate 13 is formed with mounting grooves 1311, and the number of the mounting grooves 1311 is the same as the number of the first vanes 121. A stripe portion 133 is provided in the mounting groove 1311, and at least one mounting groove 1311 is provided with a small hole 134 extending through the lower plate 13, and the bottom of a first vane corresponding to this mounting groove 1311 is provided with the first position-limiting portion 321 for cooperating with the small hole 134. In this embodiment, each of the mounting grooves 1311 is provided with one small hole 134. In assembling the impeller 1, the first position-limiting portions 321 at the bottoms 1211 of the first vanes 121 are inserted into respective holes 134, the bottoms 1211 of the first vanes 121 are inserted into respective mounting grooves 1311, and the first vanes 121 are fixed to the lower plate 13 by ultrasonic welding, thus forming the impeller 1. The lower plate 13 is formed with an impeller mounting hole 136, and the impeller 1 is sleeved on an outer circumferential surface of the shaft 40 via the impeller mounting hole 136.

Figure 12:
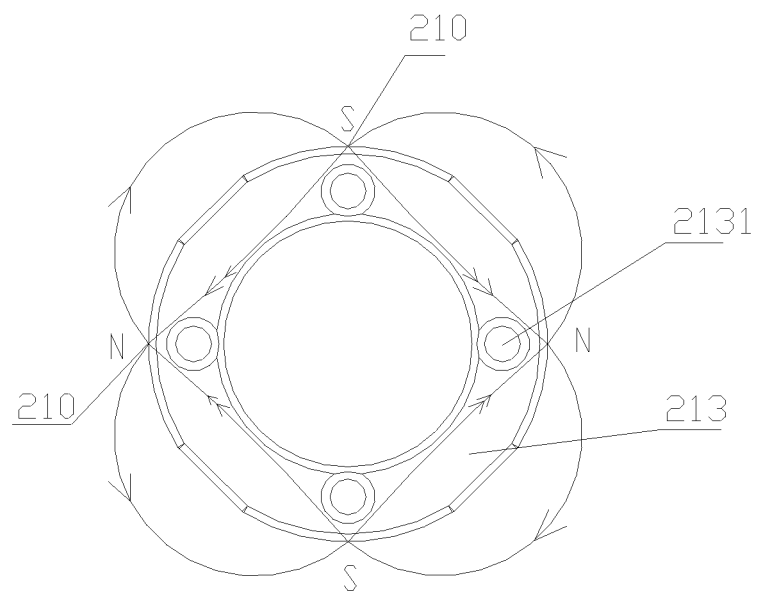
FIG. 12 is a schematic front view showing the structure of a first end surface of the permanent magnet in FIG. 9, and also showing the distribution of magnetic lines of force.
Figure 13:
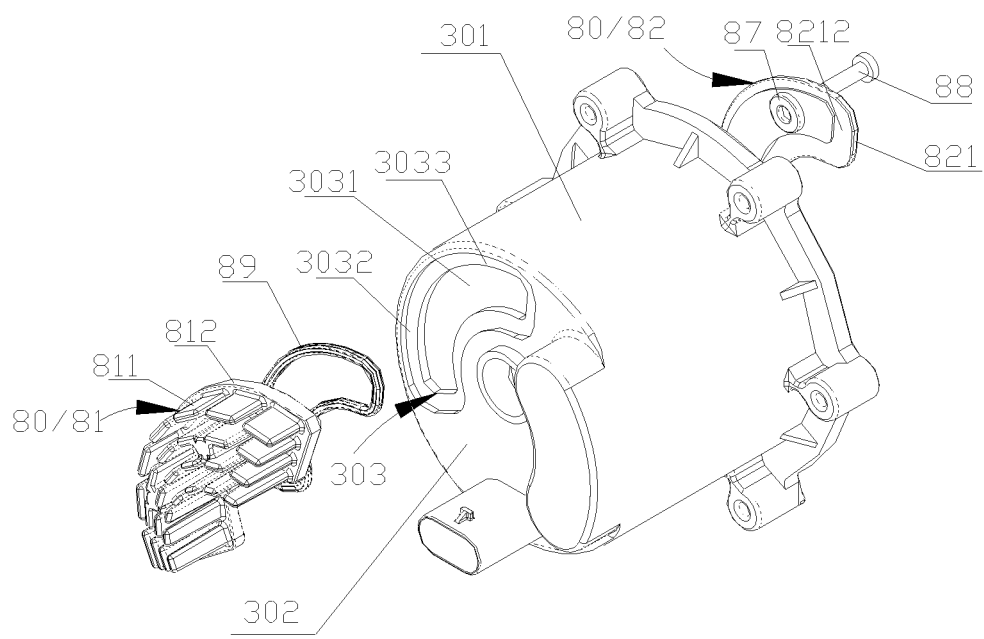
FIG. 13 is a schematic exploded view showing the structure of a second housing and a heat dissipating assembly in FIG. 1.
Figure 14:
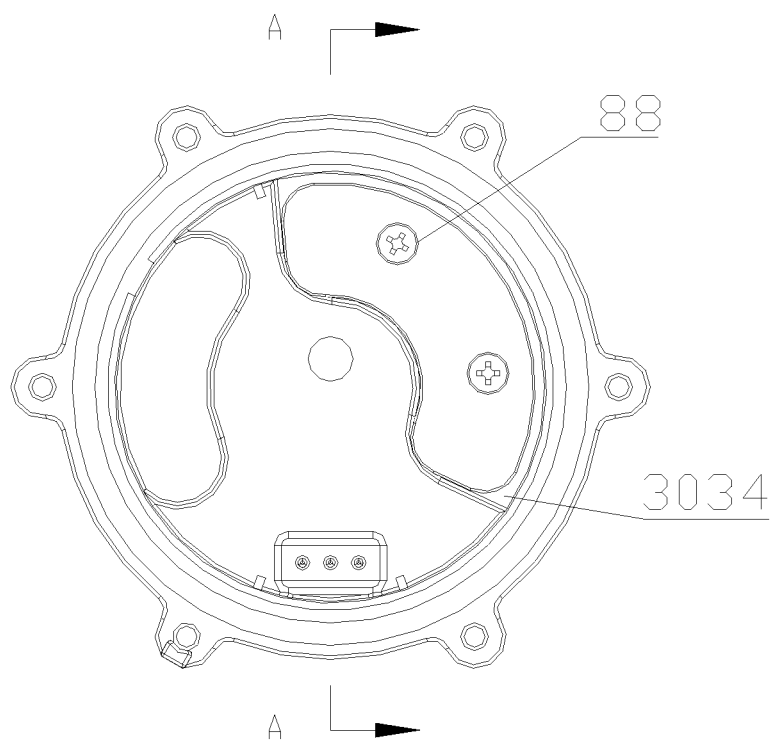
FIG. 14 is a schematic top view showing the structure of the second housing and the heat dissipating assembly in FIG. 13 which are assembled.
Figure 15:
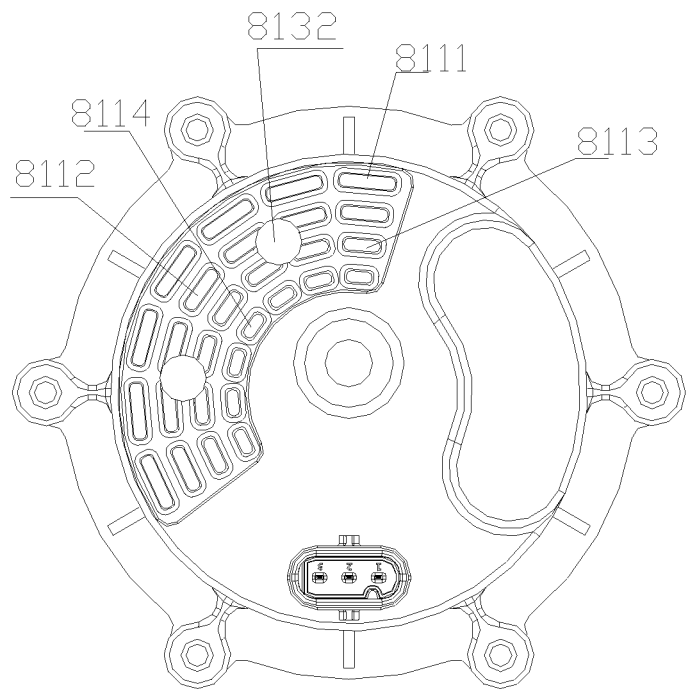
FIG. 15 is a schematic bottom view showing the structure of the second housing and the heat dissipating assembly in FIG. 13 which are assembled.
Figure 16:
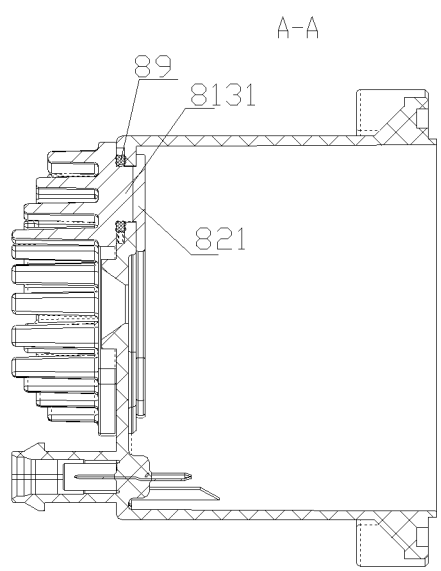
FIG. 16 is a schematic structural sectional view of FIG. 14 taken along line A-A.
Figure 17:
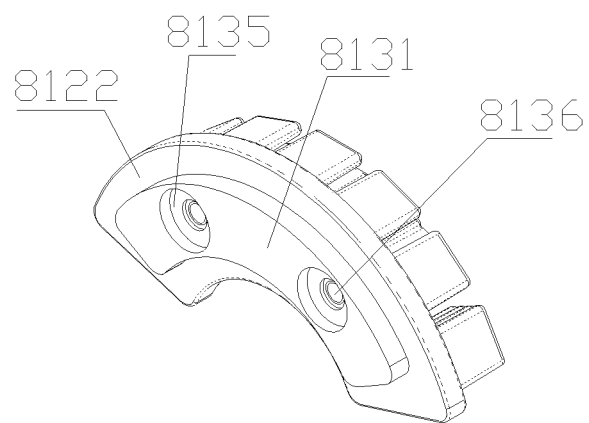
FIG. 17 is a schematic perspective view showing the structure of a heat dissipating portion in FIG. 13.
Figure 18:
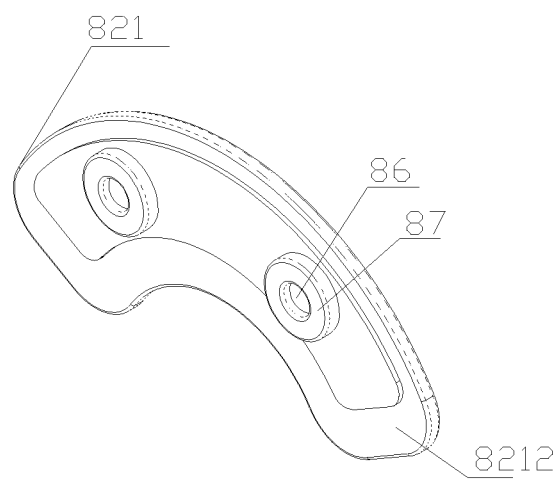
FIG. 18 is a schematic perspective view showing the structure of a second metal plate of a heat conducting portion in FIG. 13.
Figure 19:
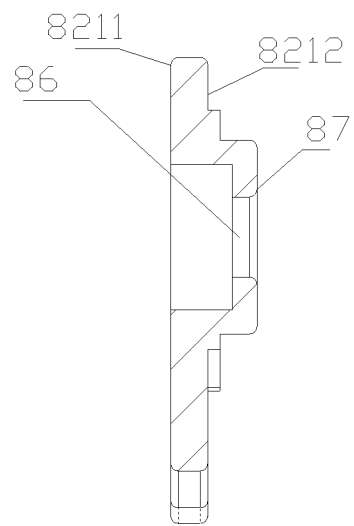
FIG. 19 is a schematic sectional view showing the structure of the second metal plate of the heat conducting portion in FIG. 18.

In this embodiment, the lower plate 13 and the rotor 2 are integrally formed by injection molding. The rotor 2 includes the permanent magnet 21. Referring to FIGS. 9 to 12, the permanent magnet 21 has an approximately annular shape. The permanent magnet 21 has polar-anisotropic orientation, and N-poles and S-poles of the permanent magnet 21 are alternately presented in a circumferential direction. In this embodiment, the permanent magnet 21 includes two N-poles and two S-poles. The permanent magnet 21 includes an outer peripheral surface 211 and an inner peripheral surface 212. The outer peripheral surface 211 has four planes 2111 and four cambered surfaces 2112, and the planes 2111 are arranged at the boundary between adjacent S-pole and N-pole. As shown in FIG. 12, for the permanent magnet 21, the stator assembly 60 is provided at the periphery of the outer peripheral surface 211 of the permanent magnet 21. At the periphery of the permanent magnet 21, the orientation of the magnetic lines of force has an approximately circular arc shape, and starts from an N-pole in the outer peripheral surface 211 of the permanent magnet 21 to a circumferentially adjacent S-pole in the outer peripheral surface 211 of the permanent magnet 21, and is schematically indicated by a single-headed arrow in the drawing. Inside the permanent magnet 21, the orientation of the magnetic lines of force starts from an S-pole of the permanent magnet 21 to an adjacent N-pole of the permanent magnet 21, and is schematically indicated by a double-headed arrow in the drawing. In the circumferential direction of the permanent magnet 21, the N-poles and S-poles form magnetic flux concentrating portions 210, and between adjacent magnetic flux concentrating portions 210, less magnetic lines of force are distributed at a portion close to the outer peripheral surface 211 of the permanent magnet 21, and the plane 2111 may be formed at such positions to remove the portion with a low magnetic flux, thereby improving the magnetic flux density, and also reducing the weight of the permanent magnet 21. Furthermore, the rotor assembly 50 in this embodiment is formed by injection molding with the permanent magnet 21 as an insert, and the high temperature in the injection molding will demagnetize the permanent magnet 21, thus, the permanent magnet 21 is required to be re-magnetized after the rotor assembly is formed by injection molding, in this case, the planes 2111 may provide positioning portions for the magnetizing, to allow the permanent magnet after being re-magnetized to have the same distribution of magnetic lines of force as the permanent magnet before the injection molding.

A first edge of the plane 2111 has a length equal to the height of the permanent magnet 21, and a second edge of the plane 2111 has a length approximately ranging from 30% to 40% of the arc length of the cambered surface 2112. In this embodiment, the length of the second edge of the plane 2111 is approximately one third of the arc length of the cambered surface 2112, in this way, the magnetic flux density can be improved, and the magnetic flux will not be affected.

The permanent magnet 21 further includes a first end surface 213 and a second end surface 214. The first end surface 213 is formed with four first raised blocks 2131, and the second end surface 214 is formed with four second raised blocks 2141, and the shape of the first raised blocks 2131 are different from the shape of the second raised blocks 2141. In this embodiment, each of the first raised blocks 2131 is of an approximately circular shape, and each of the second raised blocks 2141 is of an approximately square shape. The first raised blocks 2131 and the second raised blocks 2141 are arranged corresponding to the magnetic flux concentrating portions 210. Such raised blocks may facilitate the recognition and location of the upper surface and the lower surface of the permanent magnet 21 when the permanent magnet 21 is magnetized and mounted. Furthermore, when the rotor assembly 50 is formed by taking the permanent magnet 21 as an injection molding insert, the raised blocks may restrict the permanent magnet 21 from rotating with respect to the injection molded body.

In this embodiment, the permanent magnet 21 is formed by injection molding, and the material for the injection molding is iron powder including neodymium iron boron. The iron powder is arranged according to a predetermined rule by a special manufacturing process, to allow the permanent magnet 21 formed by injection molding to meet the requirements of design. In addition, the permanent magnet 21 may also be formed by sintering.

Referring to FIGS. 3, 4, 5, 7 and 8, the rotor assembly 30 further includes a shaft sleeve 9. The shaft sleeve 9 is integrally formed with the lower plate 13 of the impeller by injection molding. The material of the shaft sleeve 9 is the same as the material of the lower plate 13. The shaft sleeve 9 is formed by surrounding the impeller mounting hole 136. The shaft sleeve 9 includes a first segment surrounded by the lower plate 13, a second segment connecting the lower side 132 of the lower plate 13 to the first end surface 213 of the permanent magnet 21, and a third segment surrounded by the permanent magnet 21. Grooves 961 are formed in an inner peripheral surface of the shaft sleeve 9, and the grooves 961 are distributed along the inner peripheral surface of the shaft sleeve 9 at equal intervals, in this way, the working medium is allowed to enter into a space between the shaft sleeve 9 and the shaft 40, to lubricate the contact surfaces of the shaft sleeve 9 and the shaft 40. Furthermore, the grooves 961 are distributed uniformly, thus reducing the unbalance during operation of the rotor assembly 50. An upper side of the lower plate 13 is provided with communicating grooves 135, and the communicating grooves 135 are in communication with the grooves 961. In the electrically driven pump 100 according to this embodiment, the rotor assembly 50 is restricted from rotating axially with respect to the shaft 40 by a snap spring 101. A friction plate 102 is provided between the snap spring 101 and the lower plate 13, in this way, the working medium may enter into a space between the friction plate 102 and the upper side 131 via the communicating grooves 135, to reduce the friction. In addition, a certain gap 3133 is formed between an outer surface of the third segment of the shaft sleeve 9 and the inner circumferential surface 212 of an injection molded layer of the permanent magnet 21. The outer surface of the third segment of the shaft sleeve 9 is connected to the inner peripheral surface 212 of the injection molded layer of the permanent magnet 21 via a connecting rib 3132, which may save the material, reduce the cost, and also reduce the weight of the rotor assembly 50.

The forming of the rotor assembly 50 includes the following steps.

Step 1 includes manufacturing parts, including forming a permanent magnet by injection molding or sintering. The permanent magnet is formed by injection molding or sintering with a material containing magnetic substances, the permanent magnet is anisotropic, and the magnetic substances form a primary magnetic field in a mould for forming the permanent magnet.

Step 2 includes forming the first part and the second part of the rotor assembly 50, including forming the first part including an upper plate and vanes by injection molding with a mixed material containing polyphenylene sulfide plastic and glass fibers, and forming the second part including a shaft sleeve and a lower plate by injection molding with a mixed material containing the polyphenylene sulfide plastic and carbon fibers and with the permanent magnet 21 as an injection molding insert.

Step 3 includes assembling a rotor assembly, including assembling the manufactured first part and second part by cooperating vane with the lower plate, and fixing the assembled first part and second part into one piece by ultrasonic welding.

Step 4 includes magnetizing, including fully magnetizing the rotor assembly. The rotor assembly formed by the above steps has a relatively simple process, and is convenient to mount.

The permanent magnet formed in step 1 has an annular shape, and an outer peripheral surface of the permanent magnet is formed with planes distributed at intervals, end surfaces of the permanent magnet are formed with raised blocks with different shapes, each plane is arranged between adjacent N-pole and S-pole, and the raised blocks are arranged at positions corresponding to respective N-poles and S-poles.

In the second part formed in step 2, the first end surface and the second end surface of the permanent magnet are each formed with an injection molded layer, and top portions of the first raised blocks and the second raised blocks are not coated by the injection molded layers, and the thickness of each of the injection molded layers formed on the first end surface and the second end surface is substantially the same as the protruding height of each of the first raised blocks and the second raised blocks. Or the thickness of the injection molded layer formed on tops of the first raised block and the second raised block is smaller than a thickness of the injection molded layer formed on other portions of the first end surface and the second end surface other than the first raised block and the second raised block.

Referring to FIGS. 13 to 19, the electrically driven pump 100 according to this embodiment further includes the heat dissipating assembly 80. The heat dissipating assembly 80 can facilitate dissipating heat of the circuit board 70, and is fixed to the second housing 30. The second housing 30 includes a side wall 301 and a bottom 302. An inner cavity of the second housing 30 includes a space enclosed by the side wall 301 and the bottom 302. The circuit board 70 is arranged in the inner cavity of the second housing 30, and the heat dissipating assembly 80 includes a heat dissipating portion 81 arranged on an outer surface of the bottom 302, and a heat conducting portion 82 arranged on an inner surface of the bottom 302.

The second housing 30 is provided with a mounting portion 303 for mounting the heat dissipating assembly 80, and the mounting portion 303 includes a sector hole 3031, a stepped portion 3032, and a protruding ring 3034. The sector hole 3031 is a through hole arranged in the bottom 302. The stepped portion 3032 is located on the outer surface of the bottom 302 and surrounds the sector hole 3031, and a stepped surface 3033 of the stepped portion 3032 is lower than the outer surface of the bottom 302. The protruding ring 3034 is located on the inner surface of the bottom 302 and surrounds the sector hole 3031.

The heat dissipating portion 81 includes multiple heat dissipating fins 811 and a first metal plate 812. The first metal plate 812 includes a first surface 8121 and a second surface 8122. The heat dissipating fins 811 are fixed to the first surface 8121 of the first metal plate 812, and the second surface 8122 of the first metal plate 812 is connected to the heat conducting portion 82 via the bottom 302. The first metal plate 812 has a sector shaped profile, and the first metal plate 812 has an arc-shaped outer circumference. After the heat dissipating portion 81 is installed onto the second housing 30, the outer periphery of the first metal plate 812 may be configured to be flush with the side wall 301 or slightly lower than the side wall 301. An inner periphery of the first metal plate 812 has an arc shape, and is configured to be approximately parallel with the outer periphery. The arc length of the outer periphery of the first metal plate 812 is greater than the arc length of the inner periphery of the first metal plate 812. The first metal plate 812 is formed with a mounting portion for mounting the heat dissipating portion, and the mounting portion for mounting the heat dissipating portion includes a sector protrusion 8131, a cylindrical protrusion 8132, and a threaded hole 8136. The sector protrusion 8131 is a protrusion formed on the second surface 8122 and protruding from the second surface 8122. The cylindrical protrusion 8132 is a protrusion formed on the first surface 8121 and protruding from the first surface 8121. The threaded hole 8136 is a threaded hole extending into the cylindrical protrusion 8132 from the sector protrusion 8131, and the threaded hole 8136 is a blind hole. In this embodiment, a height of the sector protrusion 8131 is approximately equal to the thickness of the protruding ring 3034 from the outer surface to the inner surface of the bottom 302. The sector protrusion 8131 may be inserted into the sector hole 3031 of the bottom 302, and the gap between the sector protrusion 8131 and the sector hole 3031 is tiny, to restrict the rotation therebetween. The number of the cylindrical protrusions 8132 is two, and each of the cylindrical protrusions 8132 is arranged between two adjacent rows of heat dissipating fins, and is connected integrally with the respective heat dissipating fins 811 adjacent to the cylindrical protrusion 8132.

In this embodiment, the heat dissipating fins 811 are fixed to the first metal plate 812, and the heat dissipating fins 811 are each of a strip shape. Multiple layers of the heat dissipating fins 811 are distributed from the outer periphery of the first metal plate 812 to the inner periphery of the first metal plate 812, and may be arranged at approximately equal intervals. The first layer of heat dissipating fins are close to the outer periphery of the first metal plate 812, and include first heat dissipating fins 8111. The fourth layer of heat dissipating fins are close to the inner periphery of the first metal plate 812, and include fourth heat dissipating fins 8114. A second layer of heat dissipating fins and a third layer of heat dissipating fins are sequentially arranged between the first layer of heat dissipating fins and the fourth layer of heat dissipating fins. The second layer of heat dissipating fins include second heat dissipating fins 8112, and the third layer of heat dissipating fins include third heat dissipating fins 8113. The first heat dissipating fin 8111 has a greatest width, and a smallest height, such design may improve the strength of the first heat dissipating fin 8111 on the premise of ensuring the heat dissipating area, thereby preventing the first heat dissipating fin 8111 from being broken. Since the radian is gradually decreased from the outer periphery to the inner periphery of the first metal plate 812, widths of the metal heat dissipating fins 811 are gradually decreased to ensure that the same number of heat dissipating fins are arranged in each layer, and the heights of the metal heat dissipating fins 811 are gradually increased to ensure the metal heat dissipating fins 811 at each layer to have approximately same heat dissipating areas. In this way, the width of the second heat dissipating fin 8112 is smaller than the width of the first heat dissipating fin 8111, and the height of a normal second heat dissipating fin 8112 is greater than the height of the first heat dissipating fin 8111. The width of the third heat dissipating fin 8113 is smaller than the width of the second heat dissipating fin 8112, and the height of a normal third heat dissipating fin 8113 is greater than the height of the second heat dissipating fin 8112. The width of the fourth heat dissipating fin 8114 is smaller than the width of the third heat dissipating fin 8113, and the height of the fourth heat dissipating fin 8114 is greater than the height of the third heat dissipating fin 8113. The cylindrical protrusions 8132 are arranged between part of the second heat dissipating fins 8112 and part of the third heat dissipating fins 8113, and with the cylindrical protrusions 8132, the heat dissipating area at this portion is increased. In this way, the heights of the second heat dissipating fins 8112 and the third heat dissipating fins 8113 at this portion, where the cylindrical protrusions 8132 are arranged, may have the approximately same height as the first heat dissipating fins 8111.

The heat dissipating assembly 80 further includes the heat conducting portion 82. The heat conducting portion 82 is arranged on the inner surface of the bottom 302, and the heat conducting portion 82 includes a second metal plate 821. The second metal plate 821 also has a sector shape, and the outer edge of the second metal plate 821 is greater than the outer edge of the sector hole 3031 and is smaller than the outer edge of the protruding ring 3034. The second metal plate 821 includes a first side 8211 and a second side 8212. The first side 8212 of the second metal plate 821 is close to the circuit board 70. The projections of several elements of the circuit board 70, that generate a large heat, in the direction towards the bottom 302 are within an area where the first side 8211 of the second metal plate 821 is located, and the heat generated by the elements of the circuit board 70 is transferred to the second metal plate 821 by an upper surface of the second metal plate 821. The second metal plate 821 is generally a metal plate of an aluminum material, and has a good heat transfer effect. There is a certain distance between the elements of the circuit board 70 and the second metal plate 821, thus, in this distance, heat is transferred between the elements of the circuit board 70 and the second metal plate 821 through air. For improving the heat transferring performance, heat-conductive adhesive may be filled between the circuit board 70 and the second metal plate 821, the heat-conductive adhesive does not conduct electricity, and the heat-conductive adhesive may be heat-conductive silica gel.

The first side 8211 is provided with a countersink 86, and a screw 88 after being mounted in the countersink 86 is lower than the first side 8211, thus, the arrangement of the elements on the circuit board will not be affected. The second side 8212 is provided with a sinking stage 87, and the countersink 86 penetrates through the sinking stage 87. The sinking stage 87 protrudes form the second side 8212 by a certain height, and an outer surface of the sinking stage 87 has an approximately cylindrical shape. The screw 88 passes through the countersink 86 to be fixedly connected to the first metal plate 812.

The sector protrusion 8131 of the first metal plate 812 is formed with a recessed portion 8135, and the recessed portion 8135 includes a circular arc surface. The circular arc surface may cooperate with the outer surface of the sinking stage 87, to allow the sinking stage 87 to be inserted into the recessed portion 8135. In this embodiment, the number of the sinking stages 87 and the number of the recessed portions 8135 are both two. In this way, after the sinking stages 87 are inserted into the recessed portions 8135 respectively, the rotation of the first metal plate 812 and the second metal plate 821 with respect to each other may be restricted. The bottom of the recessed portion 8135 is provided with a threaded hole 8136, and the threaded hole 8136 extends into the cylinder, however does not extend through the cylinder. The heat dissipating assembly 80 further includes a sealing ring 89. The sealing ring 89 is provided between the second surface 8122 of the first metal plate 812 and the outer surface of the bottom 302, and the sealing ring 89 is arranged on the stepped surface 3033 of the outer surface of the bottom 302. The sealing ring 89 surrounds the outer periphery of the sector protrusion 8131 of the first metal plate 812.

It should be noted that, the above embodiments are only intended for describing the present application, and should not be interpreted as limitation to the technical solutions of the present application. Although the present application is described in detail in conjunction with the above embodiments, it should be understood by the skilled in the art that, modifications or equivalent substitutions may still be made to the present application by those skilled in the art; and any technical solutions and improvements of the present application without departing from the spirit and scope of the present invention also fall into the scope of the present application defined by the claims.

What is claimed is:

1. An electrically driven pump, comprising a shaft, a rotor assembly, and a stator assembly, wherein the rotor assembly is closer to the shaft with respect to the stator assembly, the shaft is fixedly arranged, and the rotor assembly is rotatable about the shaft; the rotor assembly comprises a first part and a second part, and the first part and the second part are separately formed; the first part of the rotor assembly comprises an upper plate and vanes, the upper plate is integrally formed with the vanes by injection molding, each of the vanes comprises a fixed portion and a free portion, the fixed portion is fixed to the upper plate, and the free portion is formed with a first connecting portion; the second part of the rotor assembly comprises a lower plate, a permanent magnet and a shaft sleeve, the second part of the rotor assembly comprises an injection molded body comprising the lower plate and the shaft sleeve and formed by taking the permanent magnet as an insert, the lower plate is formed with a second connecting portion, and the first connecting portion and the second connecting portion are fixed by welding; and wherein the first part is formed by injection molding with a mixed material containing polyphenylene sulfide plastic and glass fibers and the second part is formed by injection molding with a mixed material containing the polyphenylene sulfide plastic and carbon fibers and with the permanent magnet as an injection molding insert;

the permanent magnet comprises N-poles and S-poles, the N-poles and the S-poles are alternately presented in a circumferential direction, portions where the N-poles and the S-poles are located are magnetic flux concentrating regions of the permanent magnet; the permanent magnet comprises an inner peripheral surface and an outer peripheral surface, the outer peripheral surface comprises planes and cambered surfaces, the planes and the cambered surfaces are arranged at uniform intervals, the magnetic flux concentrating regions are located in areas where the cambered surfaces are located, and each of the planes is arranged between adjacent cambered surfaces; and each of the planes has an approximately rectangular shape, and a length of a first edge of the plane is approximately equal to a height of the permanent magnet, and a length of a second edge of the plane is approximately ranging from 30% to 40% of an arc length of each of the cambered surfaces.

2. The electrically driven pump according to claim 1, wherein the first connecting portion comprises a first position-limiting portion and a second position-limiting portion which are arranged at the free portion of the vane, and the first position-limiting portion and the second position-limiting portion are each formed by protruding from the free portion of the vane, a protruding height of the second position-limiting portion is smaller than a protruding height of the first position-limiting portion; the second connecting portion comprises mounting grooves and holes which are arranged in an upper side of the lower plate, a stripe portion is provided in each of the mounting grooves, and the holes are arranged in the lower plate at positions corresponding to the mounting grooves, and the first position-limiting portion is inserted into the respective hole.

3. The electrically driven pump according to claim 1, wherein the permanent magnet comprises a first end surface and a second end surface, the first end surface and the second end surface are arranged to be approximately parallel with each other, and each of the first end surface and the second end surface is arranged to be approximately perpendicular to the outer peripheral surface, the first end surface is formed with a first raised block, and the second end surface is formed with a second raised block, the first end surface and the second end surface are coated by an injection molded layer of the rotor assembly, and a thickness of the injection molded layer formed on tops of the first raised block and the second raised block is smaller than a thickness of the injection molded layer formed on other portions of the first end surface and the second end surface other than the first raised block and the second raised block.

4. The electrically driven pump according to claim 3, wherein the shape of each of the first raised blocks is different from the shape of each of the second raised blocks, the first raised blocks and the second raised blocks are arranged corresponding to the magnetic flux concentrating regions of the permanent magnet, and each of the number of the first raised blocks and the number of the second raised blocks is the same as a total number of the magnetic flux concentrating regions of the permanent magnet.

5. The electrically driven pump according to claim 1, wherein the shaft sleeve comprises a first segment, a second segment, and a third segment, the shaft sleeve is integrally formed with the lower plate by injection molding, a tail end of the first segment of the shaft sleeve is flush with a top of an upper side of the lower plate; the third segment of the shaft sleeve is arranged between the first end surface and the second end surface of the permanent magnet, and a lower side of the lower plate and the first end surface of the permanent magnet are connected by the second segment of the shaft sleeve.

6. The electrically driven pump according to claim 1, wherein the shaft sleeve comprises an inner surface, an outer surface, the inner surface surrounds a space to form a shaft sleeve inner hole, and a gap with a certain distance is formed between the outer surface of the shaft sleeve and the injection molded layer of the permanent magnet, and the outer surface of the shaft sleeve is connected to the injection molded layer of the permanent magnet by a connecting rib.

7. The electrically driven pump according to claim 6, wherein the inner surface of the shaft sleeve is formed with at least two grooves, the grooves are distributed on the inner surface of the shaft sleeve at equal intervals, each of the grooves extends through an upper surface and a lower surface of the shaft sleeve and is in communication with the shaft sleeve inner hole.

8. The electrically driven pump according to claim 1, wherein the electrically driven pump comprises a second housing, and the second housing comprises a side wall and a bottom, and an inner cavity of the second housing comprises a space enclosed by the side wall and the bottom, a circuit board is arranged in the inner cavity of the second housing, the electrically driven pump further comprises a heat dissipating assembly, the heat dissipating assembly is fixedly connected to the second housing, the heat dissipating assembly comprises a heat conducting portion and a heat dissipating portion, the heat conducting portion is arranged in the inner cavity of the second housing, and the heat dissipating portion is arranged outside the inner cavity of the second housing, the heat conducting portion and the heat dissipating portion are both made of a metal material, the heat dissipating portion comprises a metal plate and heat dissipating fins, the metal plate comprises a first surface and a second surface, and the heat dissipating fins are distributed on the first surface of the metal plate, and the second surface of the metal plate is in contact with the heat conducting portion and fixed to the heat conducting portion.

9. The electrically driven pump according to claim 8, wherein an outer edge of the metal plate is approximately flush with an outer surface of the side wall of the second housing, or the outer edge of the metal plate is located within an extending portion of the outer surface of the side wall of the second housing, an inner edge of the metal plate is closer to a center of the bottom of the second housing with respect to the outer edge of the metal plate; and at least two layers of the heat dissipating fins are arranged from the outer edge of the metal plate to the inner edge of the metal plate.

10. The electrically driven pump according to claim 8, wherein the metal plate has an approximately sector shape, an arc length of the outer edge of the metal plate is greater than an arc length of the inner edge of the metal plate, each layer of the heat dissipating fins are arranged in a form of a circular arc, and the heat dissipating fins have gradually decreased widths and gradually increased heights in a direction from the outer edge of the metal plate towards the inner edge of the metal plate.

11. A method for manufacturing an electrically driven pump, wherein the electrically driven pump comprises a shaft, a rotor assembly, and a stator assembly, wherein the rotor assembly is closer to the shaft with respect to the stator assembly, the shaft is fixedly arranged, and the rotor assembly is rotatable about the shaft; the rotor assembly comprises a first part and a second part, and the first part and the second part are separately formed; the first part of the rotor assembly comprises an upper plate and vanes, the upper plate is integrally formed with the vanes by injection molding, each of the vanes comprises a fixed portion and a free portion, the fixed portion is fixed to the upper plate, and the free portion is formed with a first connecting portion; the second part of the rotor assembly comprises a lower plate, a permanent magnet and a shaft sleeve, the second part of the rotor assembly comprises an injection molded body comprising the lower plate and the shaft sleeve and formed by taking the permanent magnet as an insert, the lower plate is formed with a second connecting portion, and the first connecting portion and the second connecting portion are fixed by welding; and wherein the first part is formed by injection molding with a mixed material containing polyphenylene sulfide plastic and glass fibers and the second part is formed by injection molding with a mixed material containing the polyphenylene sulfide plastic and carbon fibers and with the permanent magnet as an injection molding insert;

the permanent magnet comprises N-poles and S-poles, the N-poles and the S-poles are alternately presented in a circumferential direction, portions where the N-poles and the S-poles are located are magnetic flux concentrating regions of the permanent magnet; the permanent magnet comprises an inner peripheral surface and an outer peripheral surface, the outer peripheral surface comprises planes and cambered surfaces, the planes and the cambered surfaces are arranged at uniform intervals, the magnetic flux concentrating regions are located in areas where the cambered surfaces are located, and each of the planes is arranged between adjacent cambered surfaces; and each of the planes has an approximately rectangular shape, and a length of a first edge of the plane is approximately equal to a height of the permanent magnet, and a length of a second edge of the plane is approximately ranging from 30% to 40% of an arc length of each of the cambered surfaces, the formation of the rotor assembly comprises:
step 1, manufacturing parts, comprising: forming the permanent magnet by injection molding or sintering, wherein the permanent magnet is formed by injection molding or sintering with a material containing magnetic substances, the permanent magnet is anisotropic, and the magnetic substances are configured to form a primary magnetic field in a mould for forming the permanent magnet;
step 2, forming the first part and the second part, comprising: forming the first part comprising the upper plate and the vanes by injection molding with a mixed material containing polyphenylene sulfide plastic and glass fibers, and forming the second part comprising the shaft sleeve and the lower plate by injection molding with a mixed material containing the polyphenylene sulfide plastic and carbon fibers and with the permanent magnet as an injection molding insert;

step 3, assembling the rotor assembly, comprising: assembling the manufactured first part and second part by cooperating vanes with the lower plate, and fixing the assembled first part and second part into one piece by ultrasonic welding; and step 4, magnetizing, comprising fully magnetizing the rotor assembly.

12. The method for manufacturing the electrically driven pump according to claim 11, wherein the permanent magnet formed in step 1 is of an approximately annular shape, and an outer periphery of the permanent magnet is formed with planes distributed at intervals, the permanent magnet comprises a first end surface and a second end surface, the first end surface is formed with a first raised block, and the second end surface is formed with a second raised block, the first raised block is protruding outwards from the first end surface, and the second raised block is protruding outwards from the second end surface, and the first raised block has a cross sectional shape different from a cross sectional shape of the second raised block.

13. The method for manufacturing the electrically driven pump according to claim 11, wherein in the second part formed in step 2, the first end surface and the second end surface of the permanent magnet are each formed with an injection molded layer, a thickness of the injection molded layer formed on the second end surface is approximately the same as a protruding height of the second raised block, and a thickness of the injection molded layer formed on the first end surface is approximately the same as a protruding height of the first raised block.

* * * * *